United States Patent
Niu

(10) Patent No.: US 11,869,398 B2
(45) Date of Patent: Jan. 9, 2024

(54) SCREEN DISPLAY METHOD AND APPARATUS

(71) Applicant: ZTE CORPORATION, Shenzhen (CN)

(72) Inventor: Chao Niu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/622,155

(22) PCT Filed: Jun. 15, 2020

(86) PCT No.: PCT/CN2020/096115
§ 371 (c)(1),
(2) Date: Dec. 22, 2021

(87) PCT Pub. No.: WO2020/259338
PCT Pub. Date: Dec. 30, 2020

(65) Prior Publication Data
US 2022/0366825 A1  Nov. 17, 2022

(30) Foreign Application Priority Data

Jun. 24, 2019 (CN) .......................... 201910549467.4

(51) Int. Cl.
*G09G 3/00* (2006.01)
*G06F 3/04847* (2022.01)
*G06F 3/0488* (2022.01)

(52) U.S. Cl.
CPC .......... *G09G 3/035* (2020.08); *G06F 3/0488* (2013.01); *G06F 3/04847* (2013.01);
(Continued)

(58) Field of Classification Search
CPC ............. G09G 3/035; G09G 2320/028; G09G 2340/0464; G09G 2354/00;
(Continued)

(56) References Cited

U.S. PATENT DOCUMENTS 10,360,876 B1 * 7/2019 Rahman .................... G09G 5/14
10,635,292 B2 * 4/2020 Aurongzeb .............. G09G 5/00
(Continued)

FOREIGN PATENT DOCUMENTS

| CN | 106201392 A | 12/2016 |
|---|---|---|
| CN | 107948430 A | 4/2018 |
| CN | 108055411 A | 5/2018 |

OTHER PUBLICATIONS

International Search Report for Application No. PCT/CN2020/096115, dated Sep. 21, 2020, 4 pages including English translation.
(Continued)

*Primary Examiner* — Ibrahim A Khan
(74) *Attorney, Agent, or Firm* — Morgan, Lewis & Bockius LLP

(57) ABSTRACT

A screen display method includes: detecting a touch operation acting on a screen; determining display adjustment information for a bent area of the screen according to the touch operation; and adjusting display content in the bent area according to the display adjustment information.

16 Claims, 10 Drawing Sheets

(52) U.S. Cl.
CPC ............... *G09G 2320/028* (2013.01); *G09G 2340/0464* (2013.01); *G09G 2354/00* (2013.01)

(58) Field of Classification Search
CPC .. G09G 2380/02; G09G 5/36; G06F 3/04847; G06F 3/0488; G06F 1/1652; G06F 3/0418; G06F 3/04886; G06F 3/04897
See application file for complete search history.

(56) References Cited

U.S. PATENT DOCUMENTS

| | | | | |
|---|---|---|---|---|
| 10,860,271 | B2* | 12/2020 | Oh | G06F 3/04883 |
| 11,481,035 | B2* | 10/2022 | Trinh | G06F 1/1649 |
| 2010/0056223 | A1* | 3/2010 | Choi | G06F 1/1686 |
| | | | | 455/566 |
| 2012/0162267 | A1* | 6/2012 | Shimazu | G06F 3/04883 |
| | | | | 345/684 |
| 2012/0235894 | A1* | 9/2012 | Phillips | G09G 3/36 |
| | | | | 345/156 |
| 2012/0274575 | A1* | 11/2012 | Solomon | G06F 3/0488 |
| | | | | 345/1.3 |
| 2013/0002545 | A1* | 1/2013 | Heinrich | G02B 27/017 |
| | | | | 345/157 |
| 2013/0162633 | A1* | 6/2013 | Berger | G09G 5/00 |
| | | | | 345/582 |
| 2013/0222416 | A1* | 8/2013 | Kim | G09G 3/20 |
| | | | | 345/173 |
| 2013/0222432 | A1* | 8/2013 | Arrasvuori | G06F 3/04815 |
| | | | | 345/660 |
| 2014/0055375 | A1* | 2/2014 | Kim | G06F 1/1652 |
| | | | | 345/173 |
| 2014/0098075 | A1* | 4/2014 | Kwak | G09G 3/2003 |
| | | | | 345/204 |
| 2014/0165006 | A1* | 6/2014 | Chaudhri | H04N 7/147 |
| | | | | 715/835 |
| 2014/0173471 | A1* | 6/2014 | Maenpaa | G06F 1/1637 |
| | | | | 715/763 |
| 2015/0015513 | A1* | 1/2015 | Kwak | G06F 3/0488 |
| | | | | 345/173 |
| 2015/0177906 | A1* | 6/2015 | Yairi | G06F 3/013 |
| | | | | 345/648 |
| 2015/0220118 | A1* | 8/2015 | Kwak | H04M 1/0268 |
| | | | | 345/520 |
| 2015/0220172 | A1* | 8/2015 | Garcia | H05K 5/026 |
| | | | | 345/156 |
| 2015/0227173 | A1* | 8/2015 | Hwang | G06F 1/1652 |
| | | | | 345/619 |
| 2015/0348453 | A1* | 12/2015 | Jin | G09F 9/301 |
| | | | | 345/173 |
| 2016/0070305 | A1* | 3/2016 | Kim | G06F 1/1626 |
| | | | | 345/173 |
| 2016/0187994 | A1* | 6/2016 | La | G06F 3/147 |
| | | | | 345/619 |
| 2016/0313966 | A1* | 10/2016 | Jeong | G06F 3/1423 |
| 2017/0017313 | A1* | 1/2017 | Rakshit | G09G 3/035 |
| 2017/0052566 | A1* | 2/2017 | Ka | G09G 3/035 |
| 2017/0092703 | A1* | 3/2017 | Bae | G02F 1/1368 |
| 2017/0153792 | A1* | 6/2017 | Kapoor | G06F 3/04883 |
| 2017/0169759 | A1* | 6/2017 | Jang | G09G 3/3406 |
| 2017/0278483 | A1 | 9/2017 | Miyazawa et al. | |
| 2018/0196582 | A1* | 7/2018 | Das | G06F 1/1626 |
| 2019/0051230 | A1 | 2/2019 | Jeon et al. | |
| 2019/0258397 | A1* | 8/2019 | Ryu | G06F 3/002 |
| 2020/0192547 | A1* | 6/2020 | Kim | G06F 1/1641 |
| 2020/0387285 | A1* | 12/2020 | Jo | G06T 11/40 |

OTHER PUBLICATIONS

Extended European Search Report for Application No. 20833013.4, dated Jun. 14, 2023, 8 pages.

* cited by examiner

SCREEN DISPLAY METHOD AND APPARATUS

CROSS-REFERENCES TO RELATED APPLICATIONS

This application is a national stage application filed under 35 U.S.C. 371 based on International Patent Application No. PCT/CN2020/096115, filed on Jun. 15, 2020, which claims priority to Chinese Patent Application No. 201910549467.4 filed with the China National Intellectual Property Administration (CNIPA) on Jun. 24, 2019, the disclosures of which are incorporated herein by reference in their entireties.

TECHNICAL FIELD

Embodiments of the present application relate to, but are not limited to, the field of terminal technology, for example, a screen display method and apparatus.

BACKGROUND

With the development of terminal technology, the screen technology of a terminal device is greatly improved. A screen of the terminal device has evolved from a conventional flat screen to a curved screen, even a bendable screen. Due to the bending characteristics of the curved screen and the bendable screen, the content display effects of the curved screen and the bendable screen are somewhat different from that of the conventional flat screen. Using a smartphone having the curved screen as an example, an image displayed in a bent area of the curved screen is distorted significantly, resulting in poor user experience.

SUMMARY

The present application provides a screen display method and apparatus, which can improve user experience.

The present application provides a screen display method which includes: detecting a touch operation acting on a screen; determining display adjustment information for a bent area of the screen according to the touch operation; and adjusting display content in the bent area according to the display adjustment information.

The present application provides a screen display apparatus which includes a detection module, an information determination module and a processing module. The detection module is configured to detect a touch operation acting on a screen. The information determination module is configured to determine display adjustment information for a bent area of the screen according to the touch operation. The processing module is configured to adjust display content in the bent area according to the display adjustment information.

The present application provides a mobile terminal which includes a memory and a processor. The memory is configured to store a computer program which, when executed by the processor, implements the preceding screen display method.

The present application provides a computer-readable storage medium configured to store a computer program which, when executed by a processor, implements the preceding screen display method.

BRIEF DESCRIPTION OF DRAWINGS

The drawings are used to provide a further understanding of the technical solution of the present application and constitute a part of the specification. In conjunction with embodiments of the present application, the drawings are intended to illustrate and not to limit the technical solution of the present application.

DETAILED DESCRIPTION

Figure 1:
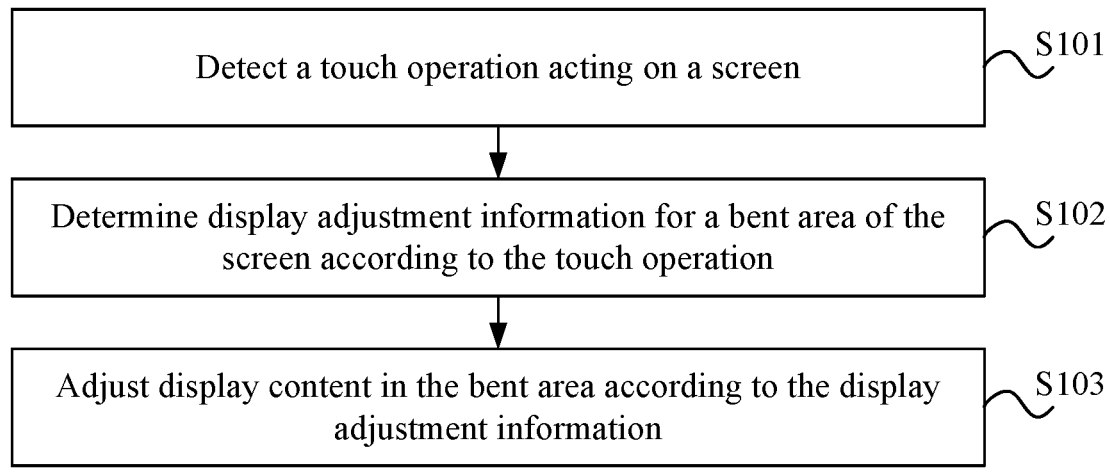
FIG. 1 is a flowchart of a screen display method according to an embodiment of the present application.

Embodiments of the present application are described below in conjunction with drawings.

The steps illustrated in the flowcharts among the drawings may be performed by a computer system such as a group of computers capable of executing instructions. Moreover, although logical sequences are illustrated in the flowcharts, the steps illustrated or described may be performed in sequences different from those described herein in some cases.

The embodiments of the present application provide a screen display method and apparatus. The screen display method and apparatus can be applied to a mobile terminal including at least one screen. The screen of the mobile terminal may have a bent area (which may also be referred to as a folding area) or the screen of the mobile terminal may be foldable to form at least one bent area. The bent area may be an incomplete planar area, an edge of one or more planar areas, or a connection area or a transition area of two or more planar display areas. It is not limited in the present application.

In one example, the mobile terminal in the present embodiment may include an unfoldable screen. The screen may include a planar area and one or more bent areas (for example, the bent areas are curved surfaces in shape) bendt and extending from one or more sides of the planar area. The bent areas may cover side walls of the mobile terminal. For example, the planar area may bend and extend to a left side and a right side so as to obtain two bent areas, the planar area may be bent and extend to an upper side and a lower side so as to obtain two bent areas, or the planar area may bend and extend to the upper side, the lower side, the left side and the right side so as to obtain four bent areas. In this example, the bent area of the mobile terminal always exists and will not change. The bent area is a part of the entire screen and thus can be used for display and operation.

In another example, the mobile terminal in the present embodiment may include a foldable screen or a flexible screen. The foldable screen and the flexible screen have the characteristic of being bent at one or more positions. Using the foldable screen as an example, after bent outward at an angle and at one position, the foldable screen may be divided into two screen units facing in opposite directions for display and a bent area may be formed at a folding position of the foldable screen (that is, the bent area may be a connection area of the two screen units (planar areas)). When the foldable screen or the flexible screen is bent (folded) once, one bent area can be formed correspondingly. The bent area is also a part of the foldable screen and thus can be used for display and operation. In this example, the bent area does not always exist but is formed after the screen is bent (or folded). A position of the bent area may also not be fixed and may be determined according to a bending position of the screen. A shape of the bent area is not limited in the present application.

The mobile terminal in the present embodiment may be a single screen terminal, a double-screen terminal or a multi-screen terminal. The mobile terminal in the present embodiment may include, but is not limited to, a smartphone, a wearable device, a tablet and the like. It is not limited in the present application.

FIG. 1 is a flowchart of a screen display method according to an embodiment of the present application. As shown in FIG. 1, the screen display method provided in the present embodiment includes the steps below.

In S101, a touch operation acting on a screen is detected.

In S102, display adjustment information for a bent area of the screen is determined according to the touch operation.

In S103, display content in the bent area is adjusted according to the display adjustment information.

In an example embodiment, the display adjustment information may include at least an angle value from a reference point of a line of sight of a user to a first edge of the screen and an angle value from the reference point of the line of sight of the user to a second edge of the screen. The reference point of the line of sight of the user may be a center point of a line between two eyeballs of the user or a center point of a set eyeball (such as a left eyeball or a right eyeball). It is not limited in the present application.

The angle value from the reference point of the line of sight of the user to the first edge of the screen is an angle value of an included angle between a line from the reference point of the line of sight of the user to the first edge of the screen and the screen. The angle value from the reference point of the line of sight of the user to the second edge of the screen is an angle value of an included angle between a line from the reference point of the line of sight of the user to the second edge of the screen and the screen. The first edge may be parallel to the second edge. For example, the first edge and the second edge may be an upper edge and a lower edge of the screen or may be a left edge and a right edge of the screen.

For example, when the screen includes a planar area and at least one bent area extending in a length direction of the planar area, the display adjustment information may include an angle value from the reference point of the line of sight of the user to the first edge in a width direction of the planar area of the screen and an angle value from the reference point of the line of sight of the user to the second edge in the width direction of the planar area of the screen.

For example, when the screen includes the planar area and at least one bent area extending in the width direction of the planar area, the display adjustment information may include an angle value from the reference point of the line of sight of the user to the first edge in the length direction of the planar area of the screen and an angle value from the reference point of the line of sight of the user to the second edge in the length direction of the planar area of the screen.

For example, when the screen includes the planar area, the at least one bent area extending in the width direction of the planar area and the at least one bent area extending in the length direction of the planar area, the display adjustment information may include the angle value from the reference point of the line of sight of the user to the first edge in the length direction of the planar area of the screen, the angle value from the reference point of the line of sight of the user to the second edge in the length direction of the planar area of the screen, the angle value from the reference point of the line of sight of the user to the first edge in the width direction of the planar area of the screen and the angle value from the reference point of the line of sight of the user to the second edge in the width direction of the planar area of the screen. Subsequently, display content in the at least one bent area extending in the width direction of the planar area may be adjusted by using the angle value from the reference point of the line of sight of the user to the first edge in the length direction of the planar area of the screen and the angle value from the reference point of the line of sight of the user to the second edge in the length direction of the planar area of the screen; and display content in the at least one bent area extending in the length direction of the planar area may be adjusted by using the angle value from the reference point of the line of sight of the user to the first edge in the width direction of the planar area of the screen and the angle value from the reference point of the line of sight of the user to the second edge in the width direction of the planar area of the screen.

In an example embodiment, S101 may include detecting a touch operation on an adjustment control displayed on the screen. In an example, the adjustment control may be displayed in the bent area of the screen to facilitate an operation of the user. It is not limited in the present application. In other implementations, the adjustment control may also be displayed in other areas of the screen, such as the planar area. In an example, the adjustment control may include at least one of a touch bar, a button or a text box. A form of the adjustment control is not limited in the present application. In the present example embodiment, the adjustment control is displayed on the screen so that it is convenient for the user to trigger and control the adjustment of the display content in the bent area, it is avoided that the display adjustment information is acquired through a complicated angle information detection process and processing efficiency and user experience are improved.

In an example embodiment, S103 may include: transforming a coordinate value in a first direction of a pixel in the display content in the bent area to obtain a first result; moving a coordinate value in a second direction of a pixel in the first result according to the display adjustment information to obtain a second result; and inversely transforming a coordinate value in the first direction of a pixel in the second result to obtain adjusted display content, where the first direction is perpendicular to the second direction.

In the present example embodiment, the step of moving the coordinate value in the second direction of the pixel in the first result according to the display adjustment information to obtain the second result may include: for the pixel in the first result, maintaining a coordinate value in the first direction unchanged and calculating a coordinate value in the second direction of a moved pixel according to the display adjustment information, size information of the screen and the coordinate value in the second direction of the pixel.

In the present example embodiment, the step of calculating the coordinate value in the second direction of a moved pixel according to the display adjustment information, the size information of the screen and the coordinate value in the second direction of the pixel may include: calculating an angle value from the reference point of the line of sight of the user to the pixel according to the display adjustment information and the size information of the screen; and calculating the coordinate value in the second direction of the moved pixel according to the angle value from the reference point of the line of sight of the user to the pixel and the coordinate value in the second direction of the pixel. The angle value from the reference point of the line of sight of the user to the pixel is an angle value of an included angle between a line from the reference point of the line of sight of the user to the pixel and the screen in a clockwise direction.

In the present example embodiment, the coordinate value in the first direction of the pixel is transformed so that planar pixel information can be obtained (corresponding to the preceding first result, that is, a result of a projection of the pixel on a plane where the screen is located), stretching is performed on the planar pixel information in the second direction so that the second result is obtained, and then the coordinate value in the first direction of the pixel in the second result is inversely transformed so that the adjusted display content is obtained. For example, using the screen including one planar area and two bent areas extending from two sides of the planar area in the width direction of the planar area as an example, when the screen is in a portrait display mode, the first direction may be a width direction of the screen and the second direction may be a length direction of the screen; and when the screen is in a landscape display mode, the first direction may be the length direction of the screen and the second direction may be the width direction of the screen.

Figure 2:
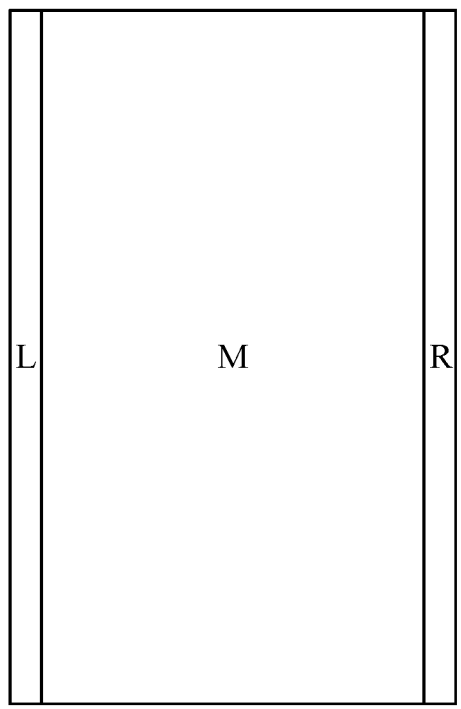
FIG. 2 is a front view of a curved screen according to an embodiment of the present application.
Figure 3:
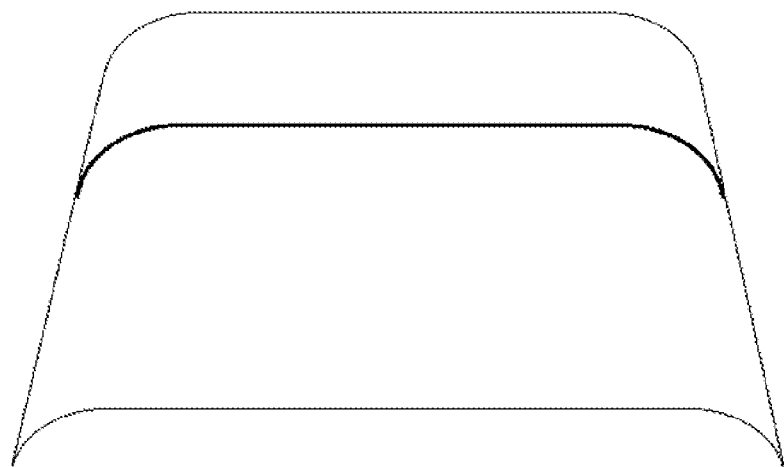
FIG. 3 is a side perspective view of the curved screen shown in FIG. 2.
Figure 4:
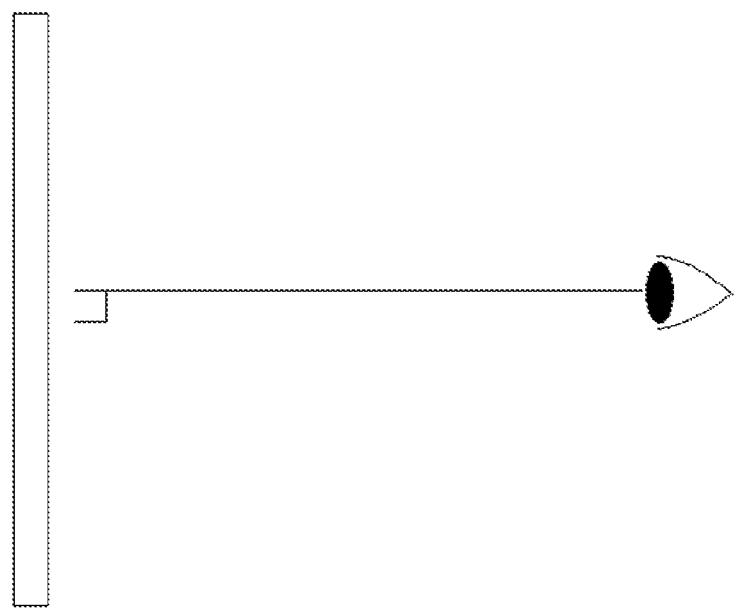
FIG. 4 is a side view of a positional relationship between a user's eyes and the curved screen shown in FIG. 2 according to an embodiment of the present application.
Figure 5:
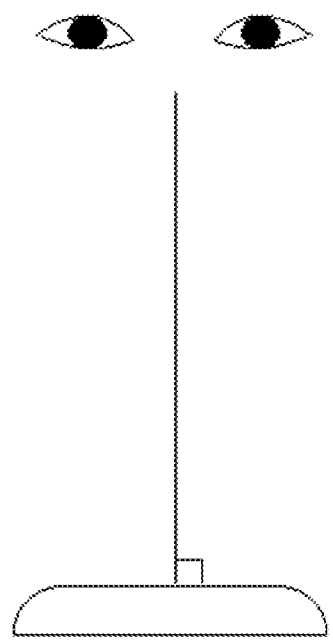
FIG. 5 is a top view of a positional relationship between a user's eyes and the curved screen shown in FIG. 2 according to an embodiment of the present application.

A smartphone having a curved screen is described below as an example. FIG. 2 is a front view of a curved screen according to an embodiment of the present application. FIG. 3 is a side perspective view of the curved screen shown in FIG. 2. FIG. 4 is a side view of a positional relationship between a user's eyes and the curved screen shown in FIG. 2 according to an embodiment of the present application. FIG. 5 is a top view of a positional relationship between a user's eyes and the curved screen shown in FIG. 2 according to an embodiment of the present application.

As shown in FIG. 2, the curved screen in this example may be divided into three parts: a left part, a middle part and a right part. The left part and the right part are a bent area L and a bent area R. The middle part is a planar area M. In FIG. 2, the bent areas are provided at side frame positions of the smartphone, that is, the bent areas are display areas extending from the planar area to two side frames of the smartphone and the bent areas can cover a left side frame and a right side frame of the smartphone. The bent area L and the bent area R have a problem of image distortion.

As shown in FIG. 3, when a horizontal straight line is displayed on the curved screen and viewed by the user's eyes at an angle from a side, two ends of the straight line bend downward. As an angle between the line of sight of the user and the curved screen changes, a degree to which the two ends of the straight line viewed by the user's eyes bend also changes. The closer the angle between the line of sight of the user and the curved screen is to 90 degrees, the smaller degree the straight line viewed by the user's eyes bends to. The farther the angle is from 90 degrees, the greater degree the straight line viewed by the user's eyes bends to. When the angle is equal to 90 degrees, the straight line viewed by the user does not bend. In a common usage scenario, the user will place the smartphone directly in front of the center of two eyes for ease of use. Therefore, as shown in FIGS. 4 and 5, an intersection where the line of sight of the user and the planar area of the curved screen intersect perpendicularly exists. FIG. 4 is the side view of the positional relationship between the user's eyes and the curved screen. FIG. 5 is the top view of the positional relationship between the user's eyes and the curved screen.

Figure 6:
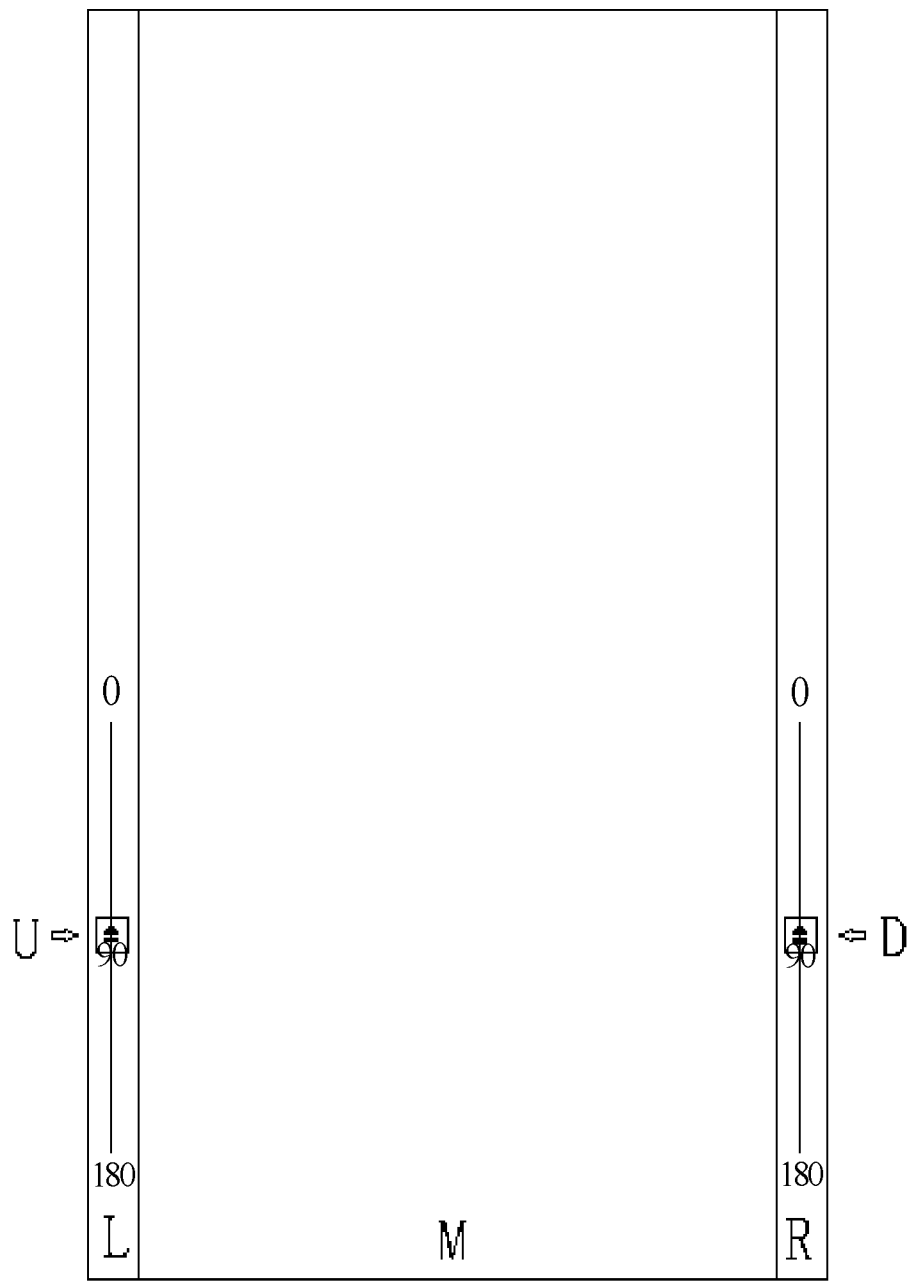
FIG. 6 is a display example diagram of a curved screen according to an example embodiment of the present application.

In the present example embodiment, as shown in FIG. 6, when the bent areas on two sides of the curved screen are used for display and operation, a control bar U and a control bar D may be displayed in the bent area L and the bent area R, respectively. One control bar (such as the control bar U) may be used for adjusting an angle value from the reference point of the line of sight of the user to the upper edge of the screen and the other control bar (such as the control bar D) may be used for adjusting an angle value from the reference point of the line of sight of the user to the lower edge of the screen. The two angle values both range from 0 to 180 degrees. It is not limited in the present application. In other implementations, when the bent areas on the two sides of the curved screen are used for display and operation, two control bars may be displayed in the planar area of the curved screen or are displayed only in the bent area on one side. Alternatively, in other implementations, the planar area or the bent area of the curved screen may display two control buttons for adjusting the angle values from the reference point of the line of sight of the user to the upper edge and the lower edge of the screen. When the two control bars are displayed on the curved screen is not limited in the present application. For example, the display of the control bars may be triggered when the bent areas are triggered for display and operation or the display of the control bars may be triggered separately by the touch operation after the bent areas are triggered for display and operation.

In the present example embodiment, the user may adjust the control bar U and the control bar D separately according to an actual usage scenario. For example, according to the actual usage scenario, the user may adjust the control bar U to make the angle value from the reference point of the line of sight of the user to the upper edge of the screen less than 90 degrees and adjust the control bar D to make the angle value from the reference point of the line of sight of the user to the lower edge of the screen greater than 90 degrees.

Initial values indicated by the control bar U and the control bar D may be 90 degrees, respectively.

In the present example embodiment, the user may adjust the two control bars continuously as needed until an image viewed by the user's eyes in the bent area is not distorted. In this manner, the display in the bent areas is adjusted by the user according to requirements without complicated information collection, detection and calculation processes, which not only improves the user experience but also reduces the processing complexity of the mobile terminal.

In the present example embodiment, after the display adjustment information for the bent area is determined, the coordinate value, in a direction of a horizontal axis (corresponding to the preceding first direction), of the pixel in the display content in the bent area may be transformed so that the first result is obtained, and then the coordinate value, in a direction of a vertical axis (corresponding to the preceding second direction), of the pixel in the first result may be moved according to the display adjustment information so that the second result is obtained; then, the coordinate value, in the direction of the horizontal axis, of the pixel in the second result is inversely transformed so that the adjusted display content is obtained. In this example, the direction of the horizontal axis may be the width direction of the screen and the direction of the vertical axis may be the length direction of the screen.

Figure 7:
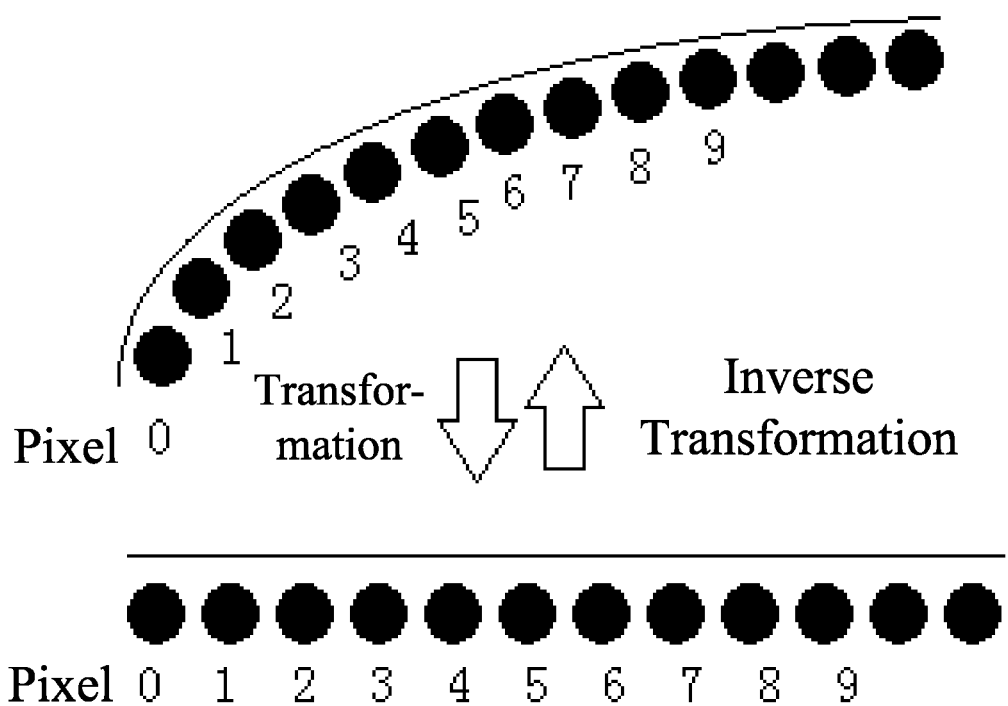
FIG. 7 is a schematic diagram of transformations and inverse transformations of coordinate values on a horizontal axis according to an example embodiment of the present application.

In the present example embodiment, before the coordinate value of the pixel in the display content on the vertical axis is corrected, the coordinate value of the pixel on the horizontal axis needs to be transformed so that actual planar pixel information is obtained and the coordinate value on the horizontal axis is inversely transformed after the coordinate value on the vertical axis is corrected. FIG. 7 is a schematic diagram of transformations and inverse transformations of coordinates on a horizontal axis according to an example embodiment of the present application. FIG. 7 illustrates a projection of the straight line displayed in the bent area on the plane where the screen is located and an arrangement of multiple pixels after the straight line is transformed. As shown in FIG. 7, an arrangement density of the pixels on the straight line may be adjusted through transformations of coordinate values on the horizontal axis so that an actual planar pixel arrangement is obtained, which facilitates the correction of the coordinate value on the vertical axis. The pixels displayed in the bent area are projected on the plane where the screen is located in the direction of the horizontal axis through the preceding transformations, and coordinates on the vertical axis are calculated based on the transformed coordinates on the horizontal axis, which can ensure accuracy. In this example, the transformations and the inverse transformations of the coordinate values on the horizontal axis may be implemented through a curved surface equation or a mapping table. For example, a relationship between the coordinate values on the horizontal axis before the transformations and the coordinate values on the horizontal axis after the transformations are established by using the mapping table, and then the coordinate values on the horizontal axis after the transformations may be determined according to the coordinate values on the horizontal axis before the transformations and the mapping table. It is not limited in the present application.

Figure 8:
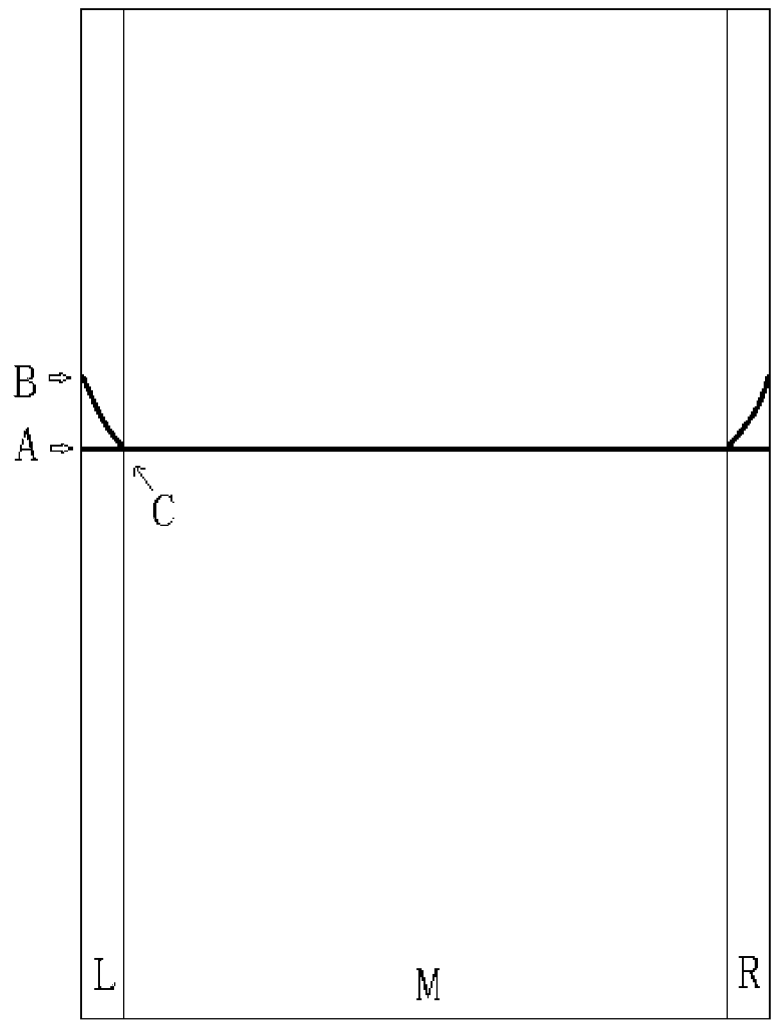
FIG. 8 is a front view of stretching according to an example embodiment of the present application.
Figure 9:
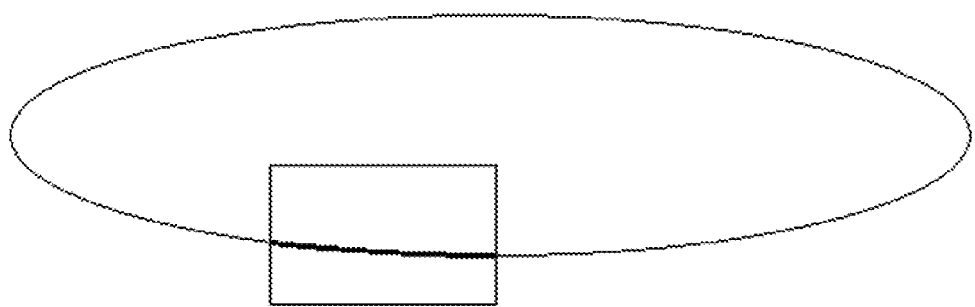
FIG. 9 is a diagram of a curve B-C shape according to an example embodiment of the present application.

Using the straight line displayed in the bent area as an example, the straight line can be stretched in a longitudinal direction through a process of correcting the coordinate value of the pixel on the vertical axis in the present embodiment. FIG. 8 is a front view of stretching according to an example embodiment of the present application. As shown in FIG. 8, all pixels on a straight line A-C displayed in the bent area need to be transformed and B-C obtained after transformations is a curve. For example, when the bent area of the curved screen is a cylindrical curved surface, the curve B-C may be an elliptical curve. Generally, the curve B-C is quite gentle. FIG. 9 is a diagram of a curve B-C shape according to an example embodiment of the present application. As shown in FIG. 9, a shape of the curve B-C may be a curve, at a bottom position, of a very flat ellipse. In this example, the display content in the bent area may be regarded as a combination of multiple straight lines and for each straight line, an equation of the curve B-C may be used for obtaining coordinate values on the vertical axis of all corrected pixels. The equation of the curve B-C may be determined according to a radius of curvature of the bent area, a total angle value of the bent area (that is, an angle value of an arc of the bent area viewed in a cross-sectional direction of the screen), the display adjustment information and the size information of the screen (such as a length of the screen, a width of the screen and the like). The equation of the curve B-C needs to reflect the process of correcting the coordinate value on the vertical axis of the pixel.

Figure 10:
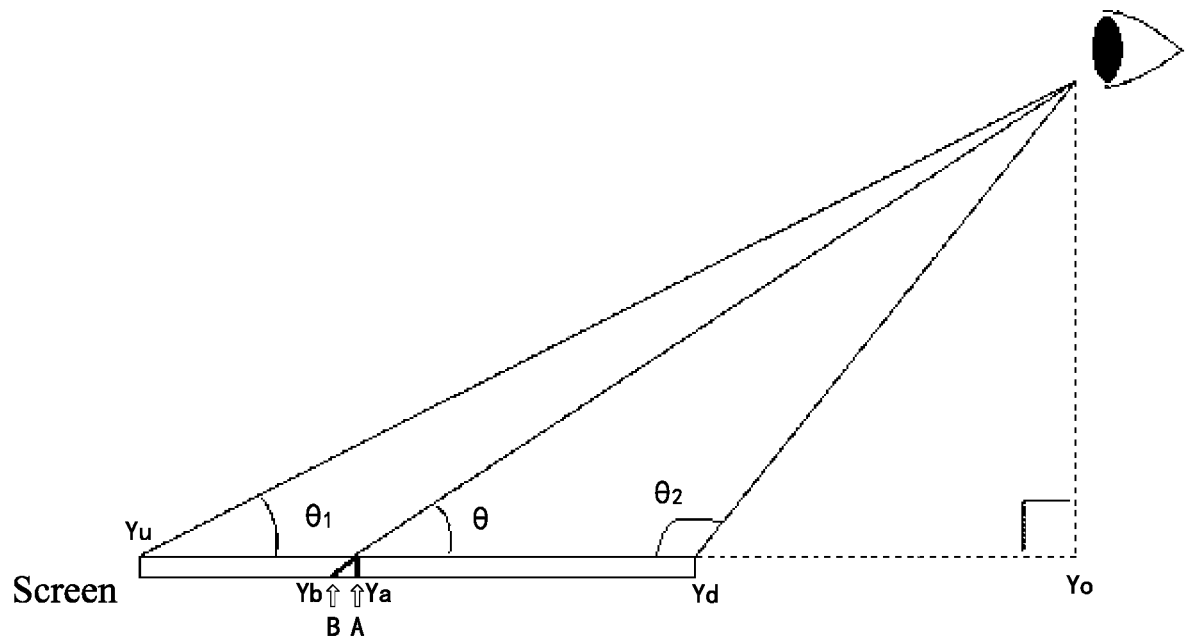
FIG. 10 is an example diagram of a longitudinal movement of a pixel according to an example embodiment of the present application.
Figure 11:
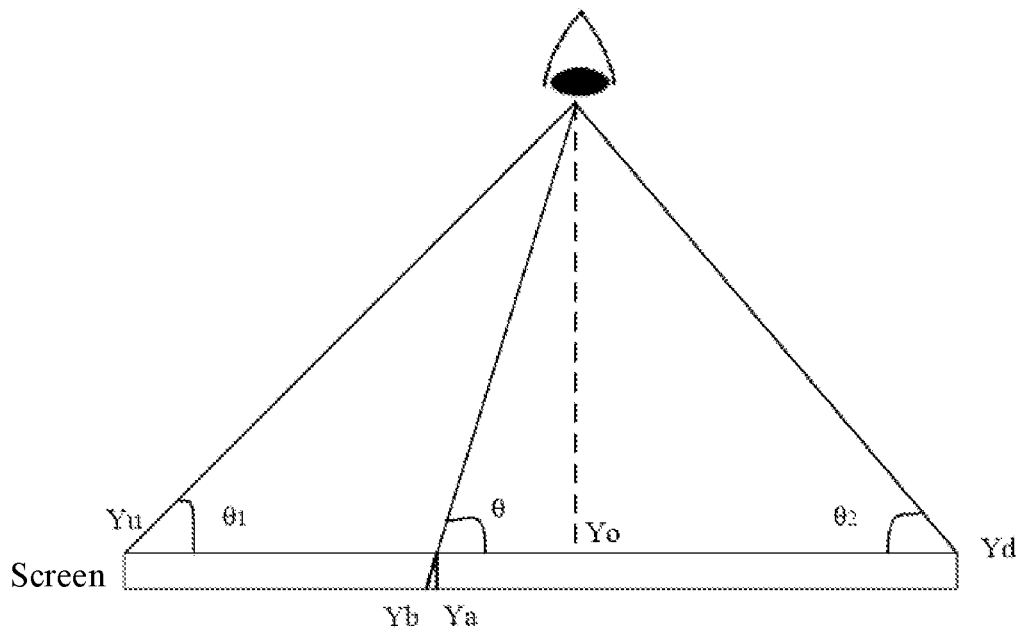
FIG. 11 is another example diagram of a longitudinal movement of a pixel according to an example embodiment of the present application.
Figure 12:
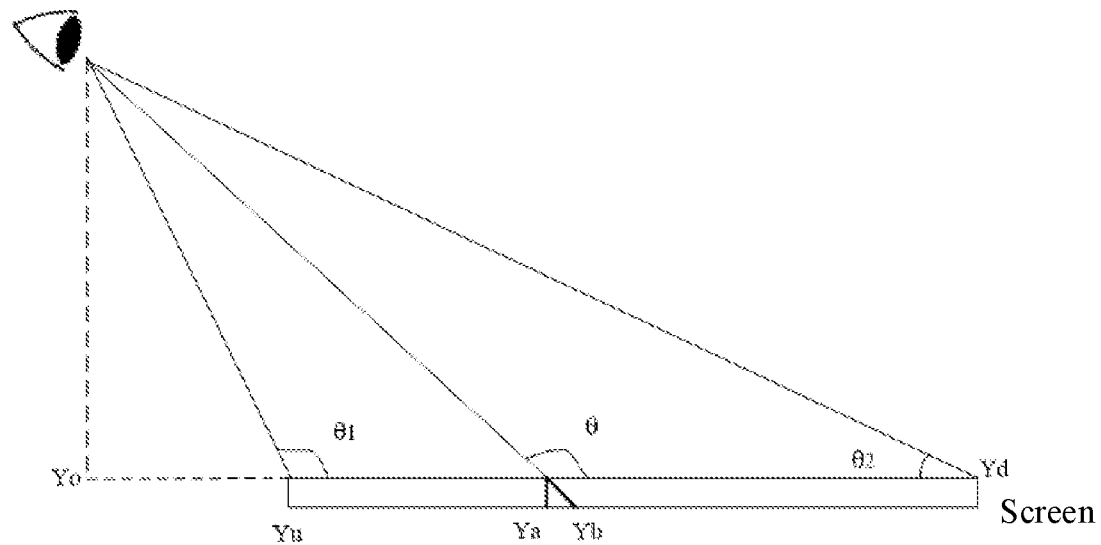
FIG. 12 is another example diagram of a longitudinal movement of a pixel according to an example embodiment of the present application.

The process of correcting the coordinate value of the pixel on the vertical axis whose coordinate value on the horizontal axis is transformed is described below with reference to FIGS. 10 to 12. FIGS. 10 to 12 are side views of positional relationships between the user's eyes and the screen in different usage scenarios. Since the coordinate value on the horizontal axis does not change in the correction process, only a change of the coordinate value on the vertical axis needs to be calculated. In this example, A represents a position of an original pixel and B represents a position of the corrected pixel.

As shown in FIG. 10, a mapping point of the user's eye on the plane where the screen is located is not on the screen and the mapping point is closer to the lower edge of the screen. In FIG. 10, Yo represents the mapping point of the user's eye on the plane where the screen is located and a vertical distance between the user's eye and Yo may be denoted as $L_1$; Yu represents the upper edge of the planar area of the screen, Yd represents the lower edge of the planar area of the screen, and a vertical distance between Yu and Yd is a length value of the planar area of the screen (hereinafter denoted as $L_3$); and a vertical distance between Yd and Yo may be denoted as $L_2$.

In FIG. 10, θ represents an angle value from the reference point of the line of sight of the user to a straight line on the screen, which passes a pixel A and is parallel to the direction of the horizontal axis, that is, an angle value of an included angle between a line, which is from the reference point of the line of sight of the user to a target point on the straight line on the screen, passes the pixel A and is parallel to the direction of the horizontal axis, and the screen in the clockwise direction, where the target point is a foot point from the reference point of the line of sight of the user to the straight line on the screen, which passes the pixel A and is parallel to the direction of the horizontal axis; $θ_1$ represents the angle value from the reference point of the line of sight of the user to the upper edge of the screen, that is, an angle value of an included angle between a line from the reference point of the line of sight of the user to a pixel on the upper edge of the screen and the screen; and $θ_2$ represents the angle value from the reference point of the line of sight of the user to the lower edge of the screen, that is, an angle value of an included angle between a line from the reference point of the line of sight of the user to a pixel on the lower edge of the screen and the screen.

Based on FIG. 10, the following formulas may be obtained:

$$\tan\theta_1 = \frac{L_1}{L_3 + L_2};$$

$$\tan(\pi - \theta_2) = -\tan\theta_2 = \frac{L_1}{L_2}.$$

Based on the preceding two formulas, the following may be calculated:

$$L_1 = \frac{L_3 \tan\theta_1 \tan\theta_2}{\tan\theta_2 + \tan\theta_1};$$

$$L_2 = \frac{-L_3 \tan\theta_1}{\tan\theta_2 + \tan\theta_1}.$$

$L_3$ is the length value of the screen, which is a known quantity; and $\theta_1$ and $\theta_2$ are the display adjustment information determined according to the touch operation. Therefore, $L_1$ and $L_2$ can be calculated according to the three known quantities.

In this example, a coordinate value of the pixel A on the vertical axis is denoted as Ya based on an origin of coordinates on the screen and a vertical distance (hereinafter denoted as $L_4$) from the pixel A to the lower edge Yd of the screen may be obtained. Then, tan θ may be calculated according to the following formula:

$$\tan\theta = \frac{L_1}{L_2 + L_4} = \frac{\frac{L_3 \tan\theta_1 \tan\theta_2}{\tan\theta_2 + \tan\theta_1}}{L_4 - \frac{L_3 \tan\theta_1}{\tan\theta_2 + \tan\theta_1}} = \frac{L_3 \tan\theta_1 \tan\theta_2}{(L_4 - L_3)\tan\theta_1 + L_4 \tan\theta_2}.$$

In the side view shown in FIG. 11, the mapping point of the user's eye on the plane where the screen is located is on the screen. Similarly, in FIG. 11, Yo represents the mapping point of the user's eye on the plane where the screen is located and the vertical distance between the user's eye and Yo may be denoted as $L_1$; Yu represents the upper edge of the planar area of the screen, Yd represents the lower edge of the planar area of the screen, and the vertical distance between Yu and Yd is the length value of the planar area of the screen (hereinafter denoted as $L_3$); and the vertical distance between Yd and Yo may be denoted as $L_2$.

In FIG. 11, θ represents an angle value from the reference point of the line of sight of the user to the pixel A, that is, an angle value of an included angle between a line from the reference point of the line of sight of the user to the pixel A and the screen in the clockwise direction; $\theta_1$ represents the angle value from the reference point of the line of sight of the user to the upper edge of the screen, that is, the angle value of the included angle between the line from the reference point of the line of sight of the user to the pixel on the upper edge of the screen and the screen; and $\theta_2$ represents the angle value from the reference point of the line of sight of the user to the lower edge of the screen, that is, the angle value of the included angle between the line from the reference point of the line of sight of the user to the pixel on the lower edge of the screen and the screen.

Based on FIG. 11, the following formulas may be obtained:

$$\tan\theta_1 = \frac{L_1}{L_3 - L_2};$$

$$\tan\theta_2 = \frac{L_1}{L_2}.$$

Based on the preceding two formulas, the following may be calculated:

$$L_1 = \frac{L_3 \tan\theta_1 \tan\theta_2}{\tan\theta_2 + \tan\theta_1};$$

$$L_2 = \frac{L_3 \tan\theta_1}{\tan\theta_2 + \tan\theta_1}.$$

$L_3$ is the length value of the screen, which is the known quantity; and $\theta_1$ and $\theta_2$ are the display adjustment information determined according to the touch operation. Therefore, $L_1$ and $L_2$ can be calculated according to the three known quantities.

In this example, the coordinate value of the pixel A on the vertical axis is denoted as Ya based on the origin of the coordinates on the screen and the vertical distance (hereinafter denoted as $L_4$) from the pixel A to the lower edge Yd of the screen may be obtained. Then, tan θ may be calculated according to the following formula:

$$\tan\theta = \frac{L_1}{L_4 - L_2} = \frac{\frac{L_3 \tan\theta_1 \tan\theta_2}{\tan\theta_2 + \tan\theta_1}}{L_4 - \frac{L_3 \tan\theta_1}{\tan\theta_2 + \tan\theta_1}} = \frac{L_3 \tan\theta_1 \tan\theta_2}{(L_4 - L_3)\tan\theta_1 + L_4 \tan\theta_2}.$$

As shown in FIG. 12, the mapping point of the user's eye on the plane where the screen is located is not on the screen and the mapping point is closer to the upper edge of the screen. In FIG. 12, Yo represents the mapping point of the user's eye on the plane where the screen is located and the vertical distance between the user's eye and Yo may be denoted as $L_1$; Yu represents the upper edge of the planar area of the screen, Yd represents the lower edge of the planar area of the screen, and the vertical distance between Yu and Yd is the length value of the planar area of the screen (hereinafter referred to as $L_3$); and the vertical distance between Yd and Yo may be denoted as $L_2$; a vertical distance between Yu and Yo may be denoted as $L_6$; and $L_2=L_6+L_3$. θ represents the angle value from the reference point of the line of sight of the user to the pixel A, that is, the angle value of the included angle between the line from the reference point of the line of sight of the user to the pixel A and the screen in the clockwise direction; $\theta_1$ represents the angle value from the reference point of the line of sight of the user to the upper edge of the screen, that is, the angle value of the included angle between the line from the reference point of the line of sight of the user to the pixel on the upper edge of the screen and the screen; and $\theta_2$ represents the angle value from the reference point of the line of sight of the user to the lower edge of the screen, that is, the angle value of the included angle between the line from the reference point of the line of sight of the user to the pixel on the lower edge of the screen and the screen.

In this example, the coordinate value, on the vertical axis based on the origin of the coordinates on the screen, of the pixel A is denoted as Ya, and the vertical distance (hereinafter denoted as $L_4$) from the pixel A to the lower edge Yd of the screen and a vertical distance (hereinafter denoted as $L_5$) from the pixel A to the upper edge Yu of the screen may be obtained; $L_4+L_5=L_3$.

Based on FIG. 12, the following formulas may be obtained:

$$\tan(\pi - \theta_1) = -\tan\theta_1 = \frac{L_1}{L_6} = \frac{L_1}{L_2 - L_3};$$

$$\tan\theta_2 = \frac{L_1}{L_2}.$$

Based on the preceding two formulas, the following may be calculated:

$$L_1 = \frac{L_3\tan\theta_1\tan\theta_2}{\tan\theta_2 + \tan\theta_1};$$

$$L_2 = \frac{L_3\tan\theta_1}{\tan\theta_2 + \tan\theta_1}.$$

$L_3$ is the length value of the screen, which is the known quantity; and $\theta_1$ and $\theta_2$ are the display adjustment information determined according to the touch operation. Therefore, $L_1$ and $L_2$ can be calculated according to the three known quantities.

Then, the following formula may be obtained according to FIG. 12:

$$\tan(\pi - \theta) = -\tan\theta = \frac{L_1}{L_5 + L_6} = \frac{L_1}{(L_3 - L_4) + (L_2 - L_3)} = \frac{L_1}{L_2 - L_4}.$$

Thus, the following may be obtained:

$$\tan\theta = \frac{L_1}{L_4 - L_2} = \frac{\frac{L_3\tan\theta_1\tan\theta_2}{\tan\theta_2 + \tan\theta_1}}{L_4 - \frac{L_3\tan\theta_1}{\tan\theta_2 + \tan\theta_1}} = \frac{L_3\tan\theta_1\tan\theta_2}{(L_4 - L_3)\tan\theta_1 + L_4\tan\theta_2}.$$

A calculation formula of $\tan\theta$ may be obtained based on FIGS. 10 to 12. Then, a coordinate value of a pixel B on the vertical axis based on the origin of the coordinates on the screen may be calculated according to the following formula:

$Yb=Ya+Ya\times(\tan\theta/\tan\theta_1)\times CorrectFactor$

The calculation formula of $\tan\theta$ is substituted into the preceding formula so that the preceding formula is transformed into the following formula:

$$Yb = Ya + Ya \times \left(\frac{L_3\tan\theta_2}{(L_4 - L_3)\tan\theta_1 + L_4\tan\theta_2}\right) \times CorrectFactor.$$

CorrectFactor is a correction factor whose value may be selected according to characteristics of the bent area of the screen, for example, calculated according to a value of a radius of curvature of the screen, the total angle value of the bent areas, $\theta_1$ and the like.

Based on FIGS. 10 to 12, it can be seen that the preceding calculation formula of the coordinate value of the pixel B on the vertical axis can be applied to the preceding various usage scenarios. The equation of the curve B-C can be obtained in conjunction with the process of correcting ordinate values of the multiple pixels on the straight line. In the present example embodiment, the equation of the curve B-C varies with a vertical distance between the pixel and Yo by a law related to $\tan\theta$. In an embodiment, a height of the curve B-C is positively related to a value of $\tan\theta$. In an example, the value of CorrectFactor may be an extremum of the coordinate values on the vertical axis in the equation of the curve B-C when $\theta$ takes a maximum value. In other words, the value of CorrectFactor is a value of the height of the curve B-C (a vertical distance between a highest point and a lowest point on the curve B-C).

Figure 13:
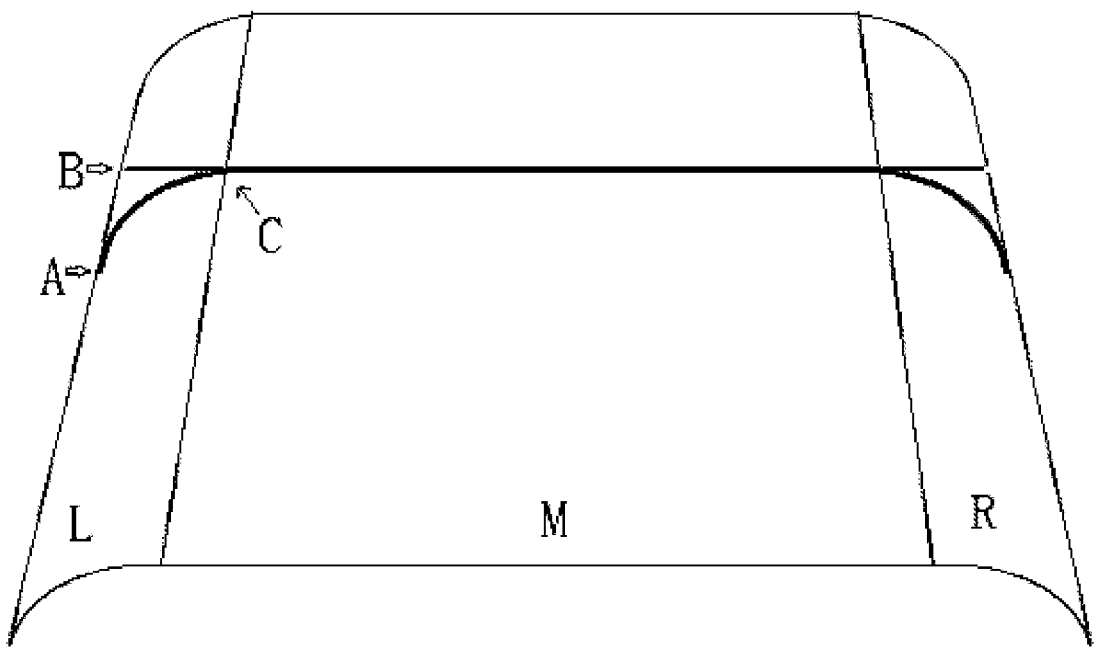
FIG. 13 is an example diagram after stretching according to an example embodiment of the present application.
Figure 14:
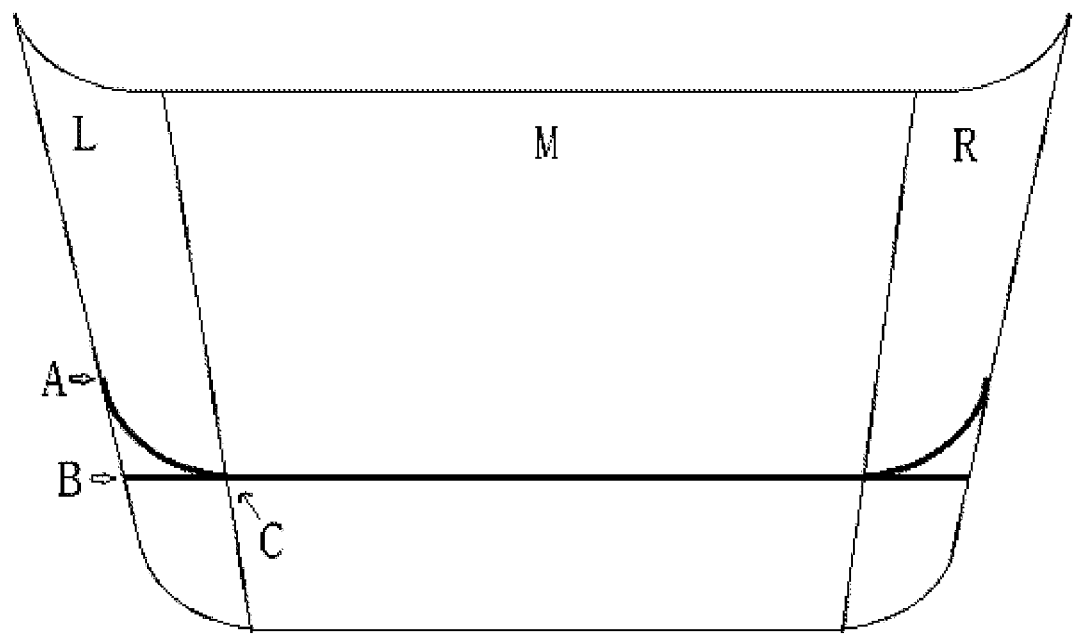
FIG. 14 is another example diagram after stretching according to an example embodiment of the present application.

In the present example embodiment, using the straight line A-C as an example, coordinate values of the straight line A-C on the horizontal axis are subjected to forward transformations according to the mapping table, coordinate values on the vertical axis of the straight line A-C subjected to forward transformations are moved using the equation of the curve B-C, and then coordinate values on the horizontal axis of the straight line A-C are subjected to inverse transformations according to the mapping table so that a final stretching result of the straight line A-C is obtained. FIGS. 13 and 14 are example diagrams of the straight line A-C after stretching in the present example embodiment. FIGS. 13 and 14 illustrate display effects of the smartphone stretched by the user in different usage scenarios, respectively. In FIG. 13, the angle value from the reference point of the line of sight of the user to the upper edge of the screen is less than the angle value from the reference point of the line of sight of the user to the lower edge of the screen. In FIG. 14, the angle value from the reference point of the line of sight of the user to the upper edge of the screen is greater than the angle value from the reference point of the line of sight of the user to the lower edge of the screen.

In the present example embodiment, the display content in the bent area is stretched with corresponding intensity so that the distortion of the displayed image caused by the bent area of the screen can be eliminated, improving the user experience.

The portrait display mode of the smartphone is described as an example in the present example embodiment. When the smartphone in this example is in the landscape display mode, the adjustment control displayed on the screen is used for adjusting the angle values from the reference point of the line of sight of the user to the left edge and the right edge of the screen. In an adjustment process, the coordinate value, in the direction of the vertical axis, of the pixel in the display content in the bent area may be transformed so that the first result is obtained, the coordinate value, in the direction of the horizontal axis, of the pixel in the first result may be moved according to the display adjustment information so that the second result is obtained, and then the coordinate value, in the direction of the vertical axis, of the pixel in the second result may be inversely transformed so that the adjusted display content is obtained. For the adjustment process, reference may be made to the processing process in the portrait display mode and thus details are not repeated here.

Figure 15:
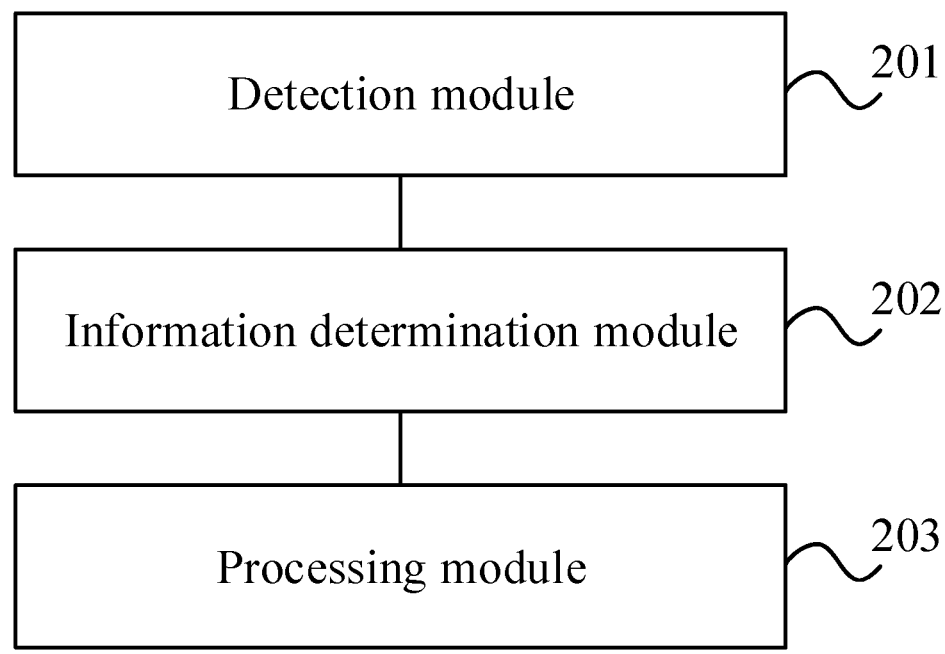
FIG. 15 is a schematic diagram of a screen display apparatus according to an embodiment of the present application.

FIG. 15 is a schematic diagram of a screen display apparatus according to an embodiment of the present application. As shown in FIG. 15, the screen display apparatus provided in the present embodiment includes a detection module 201, an information determination module 202 and a processing module 203. The detection module 201 is configured to detect a touch operation acting on a screen. The information determination module 202 is configured to determine display adjustment information for a bent area of the screen according to the touch operation. The processing module 203 is configured to adjust display content in the bent area according to the display adjustment information.

In an example embodiment, the display adjustment information may include at least an angle value from a reference point of a line of sight of a user to a first edge of the screen and an angle value from the reference point of the line of sight of the user to a second edge of the screen.

In an example embodiment, the detection module 201 is configured to detect a touch operation on an adjustment control displayed on the screen.

In an example embodiment, the processing module 203 is configured to adjust the display content in the bent area according to the display adjustment information in the following manners: transforming a coordinate value in a first direction of a pixel in the display content in the bent area to obtain a first result; moving a coordinate value in a second direction of a pixel in the first result according to the display adjustment information to obtain a second result; and inversely transforming a coordinate value in the first direction of a pixel in the second result to obtain adjusted display content, where the first direction is perpendicular to the second direction.

For a related description of the screen display apparatus provided in the present embodiment, reference may be made to the description of the preceding method embodiment and thus details are not repeated here.

An embodiment of the present application further provides a mobile terminal. The mobile terminal includes a memory and a processor, where the memory is configured to store a computer program which, when executed by the processor, implements the preceding screen display method.

Figure 16:
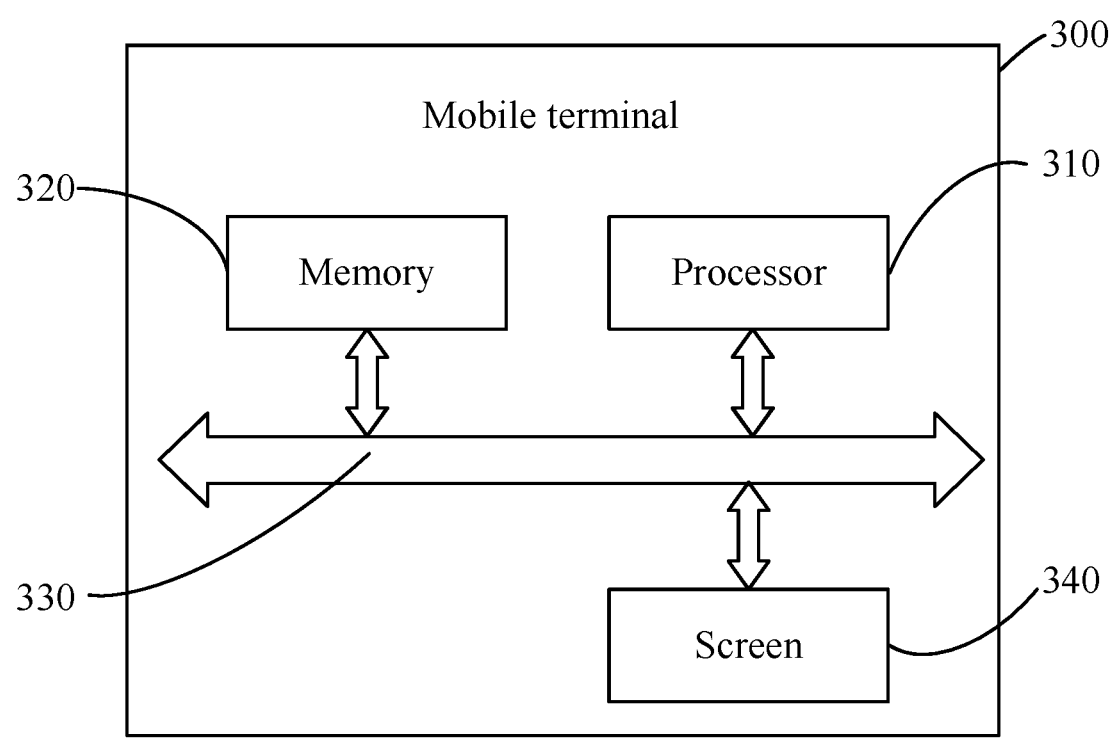
FIG. 16 is a schematic diagram of a mobile terminal according to an embodiment of the present application.

FIG. 16 is an example diagram of a mobile terminal according to an embodiment of the present application. As shown in FIG. 16, in one example, a mobile terminal 300 may include a processor 310, a memory 320, a bus system 330 and at least one screen 340. The processor 310, the memory 320 and the screen 340 are connected to each other via the bus system 330. The memory 320 is configured to store instructions and the processor 310 is configured to execute the instructions stored in the memory 320 to control the screen 340 to display information input by a user or provided for a user. The operations of the information determination module 202 and the processing module 203 in the preceding control apparatus may be performed by the processor 310, and the operations of the detection module 201 may be performed by the screen 340.

The processor 310 may be a central processing unit (CPU). The processor 310 may also be other general-purpose processors, a digital signal processor (DSP), an application-specific integrated circuit (ASIC), a field-programmable gate array (FPGA) or other programmable logic devices, discrete gates or transistor logic devices, discrete hardware components or the like. The general-purpose processor may be a microprocessor or any conventional processor.

The memory 320 may include a read-only memory and a random-access memory and provide instructions and data for the processor 310. Part of the memory 320 may also include a non-volatile random-access memory. For example, the memory 320 may also store information on device types.

In addition to a data bus, the bus system 330 may also include a power bus, a control bus, a state signal bus and the like. In FIG. 16, multiple buses are labeled as the bus system 330.

The screen 340 may include a display panel and a touch panel. The display panel may be configured in the form of a liquid crystal display or an organic light-emitting diode lamp. The touch panel may collect a touch operation of a user on or near the touch panel and may be implemented as multiple types such as a resistive touch panel, a capacitive touch panel, or an infrared touch panel. In an example, the touch panel may cover the display panel. When the touch panel detects the touch operation on or near the touch panel, the touch operation is transmitted to the processor 310 so as to determine a type of a touch event, and then the processor 310 provides corresponding visual output on the display panel according to the type of the touch event. In some examples, the display panel and the touch panel may integrally implement an input function and an output function. It is not limited in the present application.

In the process of implementation, the processing performed by the mobile terminal 300 may be performed by an integrated logic circuit of hardware in the processor 310 or instructions in the form of software. That is, steps of the method disclosed in the embodiments of the present application may be performed by a hardware processor or may be performed by a combination of hardware and software modules in the processor. The software module may be located in a storage medium such as a random-access memory, a flash memory, a read-only memory, a programmable read-only memory, an electrically erasable programmable memory or a register. The storage medium is located in the memory 320. The processor 310 reads information in the memory 320 and performs the steps of the preceding method in combination with the hardware in the processor 310. To avoid repetition, details are not repeated here.

In addition, an embodiment of the present application further provides a computer-readable storage medium configured to store a computer program which, when executed by a processor, implements steps of the screen display method according to the preceding embodiments such as those shown in FIG. 1.

It is to be understood by those having ordinary skill in the art that some or all steps of the preceding method and function modules/units in the preceding system or apparatus may be implemented as software, firmware, hardware and suitable combinations thereof. In the hardware implementation, the division of the preceding function modules/units may not correspond to the division of physical components. For example, one physical component may have multiple functions, or one function or step may be performed jointly by multiple physical components. Some or all components may be implemented as software executed by a processor such as a digital signal processor or a microprocessor, may be implemented as hardware, or may be implemented as integrated circuits such as application-specific integrated circuits. Such software may be distributed over computer-readable media. The computer-readable media may include computer storage media (or non-transitory media) and communication media (or transitory media). As is known to those having ordinary skill in the art, the term computer storage medium includes a volatile or nonvolatile medium or a removable or non-removable medium implemented in any method or technology for storing information (such as computer-readable instructions, data structures, program modules or other data). The computer storage media include, but are not limited to, a random-access memory (RAM), a read-only memory (ROM), an electrically erasable programmable read-only memory (EEPROM), a flash memory or other memory technologies, a compact disc read-only memory (CD-ROM), a digital versatile disc (DVD) or other optical storages, a magnetic cassette, a magnetic tape, a magnetic disk or other magnetic storage devices, or any other medium that can be used for storing desired information and that can be accessed by a computer. Additionally, as is known to those having ordinary skill in the art, communication media generally include computer-readable instructions, data structures, program modules, or other data in carriers or in modulated data signals transported in other transport mechanisms and may include any information delivery medium.

What is claimed is:

1. A screen display method, comprising:
   detecting a touch operation acting on a screen;
   determining display adjustment information for a bent area of the screen according to the touch operation; and
   adjusting display content in the bent area according to the display adjustment information;
   wherein detecting the touch operation acting on the screen comprises detecting a touch operation on an adjustment control displayed on the screen, and detecting the touch operation on the adjustment control displayed on the screen comprises: detecting the touch operation on two control bars displayed in a planar area of the screen, the touch operation on two control bars displayed in the bent area, or the touch operation on two control buttons, displayed in a planar area or the bent area of the screen, for adjusting angle values from a reference point of a line of sight of a user to an upper edge and an lower edge of the screen;
   wherein adjusting the display content in the bent area according to the display adjustment information comprises:
   transforming a coordinate value in a first direction of a pixel in the display content in the bent area to obtain a first result;
   moving a coordinate value in a second direction of a pixel in the first result according to the display adjustment information to obtain a second result; and
   inversely transforming a coordinate value in the first direction of a pixel in the second result to obtain adjusted display content so that distortion of a displayed image— in the bent area is eliminated in response to the touch operation in the case where an angle between the line of sight of the user and the screen changes, wherein the first direction is perpendicular to the second direction.

2. The method according to claim 1, wherein the display adjustment information comprises an angle value of an included angle between a line from the reference point of thea line of sight of the user to a first edge of the screen and the screen and an angle value of an included angle between a line from the reference point of the line of sight of the user to a second edge of the screen and the screen.

3. The method according to claim 1, wherein moving the coordinate value in the second direction of the pixel in the first result according to the display adjustment information to obtain the second result comprises:
   for the pixel in the first result, maintaining a coordinate value in the first direction unchanged and calculating a coordinate value in the second direction of a moved pixel according to the display adjustment information, size information of the screen and the coordinate value in the second direction of the pixel.

4. The method according to claim 3, wherein calculating the coordinate value in the second direction of the moved pixel according to the display adjustment information, the size information of the screen and the coordinate value in the second direction of the pixel comprises:
   calculating an angle value from a reference point of a line of sight of a user to the pixel according to the display adjustment information and the size information of the screen; and
   calculating the coordinate value in the second direction of the moved pixel according to the angle value from the reference point of the line of sight of the user to the pixel and the coordinate value in the second direction of the pixel.

5. The method according to claim 1, wherein the transforming and the inverse transforming are implemented through a curved surface equation or a mapping table.

6. The method according to claim 1, wherein the first result is actual planar pixel information.

7. A mobile terminal, comprising a memory and a processor, wherein the memory is configured to store a computer program which, when executed by the processor, causes the processor to perform the following steps:
   detecting a touch operation acting on a screen;
   determining display adjustment information for a bent area of the screen according to the touch operation; and
   adjusting display content in the bent area according to the display adjustment information;
   wherein detecting the touch operation acting on the screen comprises detecting a touch operation on an adjustment control displayed on the screen, and detecting the touch operation on the adjustment control displayed on the screen comprises: detecting the touch operation on two control bars displayed in a planar area of the screen, the touch operation on two control bars displayed in the bent area, or the touch operation on two control buttons, displayed in a planar area or the bent area of the screen, for adjusting angle values from a reference point of a line of sight of a user to an upper edge and an lower edge of the screen;
   wherein adjusting the display content in the bent area according to the display adjustment information comprises:
   transforming a coordinate value in a first direction of a pixel in the display content in the bent area to obtain a first result;
   moving a coordinate value in a second direction of a pixel in the first result according to the display adjustment information to obtain a second result; and
   inversely transforming a coordinate value in the first direction of a pixel in the second result to obtain adjusted display content so that distortion of a displayed image in the bent area is eliminated in response to the touch operation in the case where an angle between the line of sight of the user and the screen changes, wherein the first direction is perpendicular to the second direction.

8. The mobile terminal according to claim 7, wherein the display adjustment information comprises an angle value of an included angle between a line from the reference point of the line of sight of the user to a first edge of the screen and the screen
   and an angle value of an included angle between a line from the reference point of the line of sight of the user to a second edge of the screen and the screen.

9. The mobile terminal according to claim 7, wherein the processor is configured to perform moving the coordinate value in the second direction of the pixel in the first result according to the display adjustment information to obtain the second result by:
   for the pixel in the first result, maintaining a coordinate value in the first direction unchanged and calculating a coordinate value in the second direction of a moved pixel according to the display adjustment information, size information of the screen and the coordinate value in the second direction of the pixel.

10. The mobile terminal according to claim 9, wherein the processor is configured to perform calculating the coordinate value in the second direction of the moved pixel according to the display adjustment information, the size information of the screen and the coordinate value in the second direction of the pixel by:
   calculating an angle value from a reference point of a line of sight of a user to the pixel according to the display adjustment information and the size information of the screen; and
   calculating the coordinate value in the second direction of the moved pixel according to the angle value from the reference point of the line of sight of the user to the pixel and the coordinate value in the second direction of the pixel.

11. The mobile terminal according to claim 7, wherein the transforming and the inverse transforming are implemented through a curved surface equation or a mapping table.

12. The mobile terminal according to claim 7, wherein the first result is actual planar pixel information.

13. A non-transitory computer-readable storage medium, wherein the computer-readable storage medium stores a computer program which, when executed by a processor, causes the processor to perform the following steps:
   detecting a touch operation acting on a screen;
   determining display adjustment information for a bent area of the screen according to the touch operation; and
   adjusting display content in the bent area according to the display adjustment information;
   wherein detecting the touch operation acting on the screen comprises detecting a touch operation on an adjustment control displayed on the screen, and detecting the touch operation on the adjustment control displayed on the screen comprises: detecting the touch operation on two control bars displayed in a planar area of the screen, the touch operation on two control bars displayed in the bent area, or the touch operation on two control buttons, displayed in a planar area or the bent area of the screen, for adjusting angle values from a reference point of a line of sight of a user to an upper edge and an lower edge of the screen;
   wherein adjusting the display content in the bent area according to the display adjustment information comprises:
      transforming a coordinate value in a first direction of a pixel in the display content in the bent area to obtain a first result;
      moving a coordinate value in a second direction of a pixel in the first result according to the display adjustment information to obtain a second result; and
      inversely transforming a coordinate value in the first direction of a pixel in the second result to obtain adjusted display content so that distortion of a displayed image in the bent area is eliminated in response to the touch operation in the case where an angle between the line of sight of the user and the screen changes, wherein the first direction is perpendicular to the second direction.

14. The storage medium according to claim 13, wherein the display adjustment information comprises an angle value of an included angle between a line from the reference point of the line of sight of the user to a first edge of the screen and the screen and an angle value of an included angle between a line from the reference point of the line of sight of the user to a second edge of the screen and the screen.

15. The storage medium according to claim 13, wherein the processor is configured to perform moving the coordinate value in the second direction of the pixel in the first result according to the display adjustment information to obtain the second result by:
   for the pixel in the first result, maintaining a coordinate value in the first direction unchanged and calculating a coordinate value in the second direction of a moved pixel according to the display adjustment information, size information of the screen and the coordinate value in the second direction of the pixel.

16. The storage medium according to claim 15, wherein the processor is configured to perform calculating the coordinate value in the second direction of the moved pixel according to the display adjustment information, the size information of the screen and the coordinate value in the second direction of the pixel by:
   calculating an angle value from a reference point of a line of sight of a user to the pixel according to the display adjustment information and the size information of the screen; and
   calculating the coordinate value in the second direction of the moved pixel according to the angle value from the reference point of the line of sight of the user to the pixel and the coordinate value in the second direction of the pixel.

* * * * *